L. WILLIS.
HANGER FOR THE LEADING WHEELS OF POTATO DIGGERS.
APPLICATION FILED OCT. 9, 1908.

910,337. Patented Jan. 19, 1909.

Witnesses
Harry L. Smith
Hamilton S. Turner

Inventor
Leland Willis
by his Attorneys
Smith & Frazier

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

HANGER FOR THE LEADING WHEELS OF POTATO-DIGGERS.

No. 910,337.   Specification of Letters Patent.   Patented Jan. 19, 1909.

Application filed October 9, 1908. Serial No. 456,965.

*To all whom it may concern:*

Be it known that I, LELAND WILLIS, a citizen of the United States, residing in Grenloch, New Jersey, have invented certain Improvements in Hangers for the Leading Wheels of Potato-Diggers, of which the following is a specification.

My invention relates to that class of potato diggers which are provided with two leading wheels, one on each side of the main frame, the object of my invention being to so construct the machine that these wheels are free to turn in any direction and can, at the same time, rise and fall to accommodate themselves to inequalities in the ground, this rising and falling movement being unattended with any strain upon the main frame, or any lateral tipping of the same.

Figure 1:
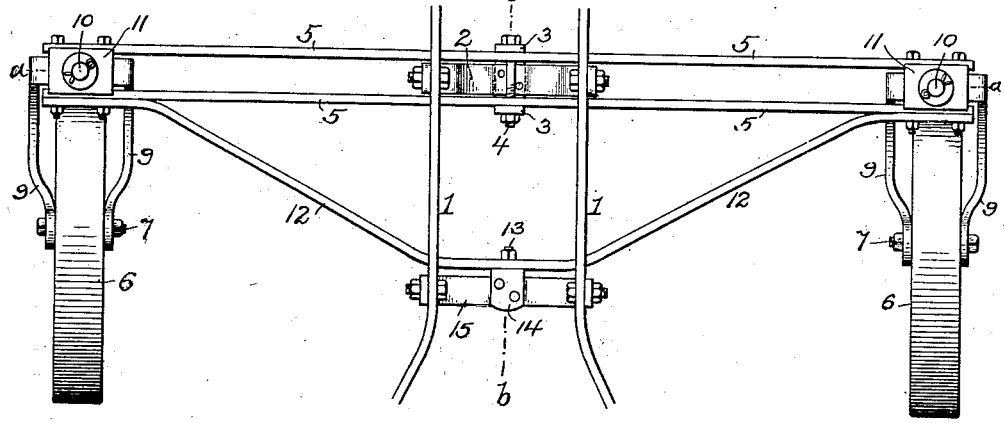
Figure 2:
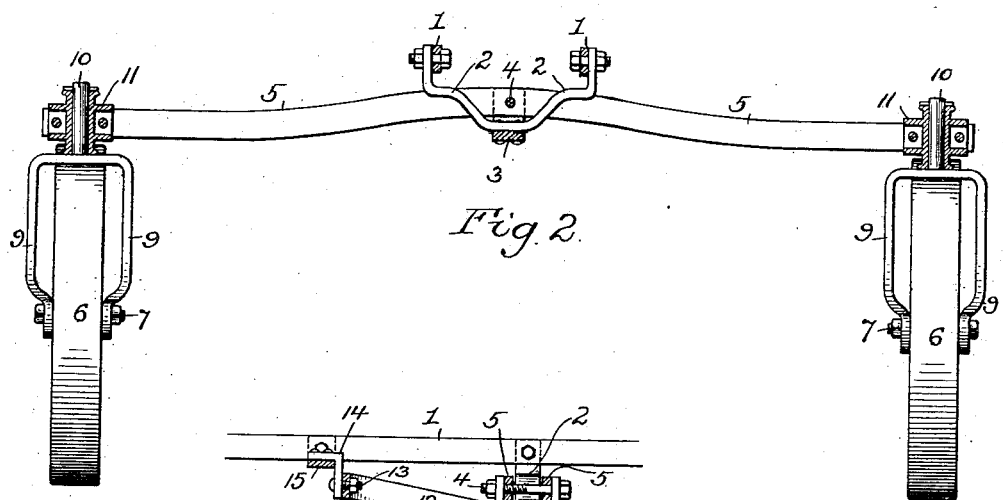
Figure 3:
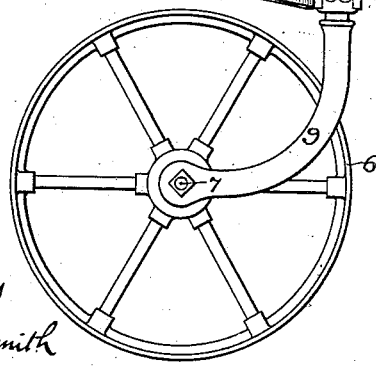

In the accompanying drawing—Figure 1 represents, in top or plan view, sufficient of the structure of the potato digger to illustrate my present invention; Fig. 2 is a transverse section of the same on the line *a—a*, and Fig. 3 is a longitudinal section on the line *b—b*.

In the drawing, 1—1 represent parts of the bars constituting the main frame of the machine, these bars being spaced apart from each other and usually connected at their front ends to the draft mechanism and at their rear ends to the mechanism whereby the digging of the potatoes is effected, but as my present invention has no reference to the latter parts of the machine, it has not been considered necessary to illustrate the same.

Extending from one of the main frame bars 1 to the other is a bridge-bar 2, depressed in the center and having bolted or otherwise rigidly secured to such depressed central portion a yoke 3, whose upper portion carries a longitudinal, horizontal pivot bolt 4. Upon the latter are pivotally mounted the transverse bars 5, constituting the tilting frame or hanger which carries the leading wheels 6 of the machine. Each of these wheels is free to turn upon an axle 7 carried by the lower end of a fork 9, which has a vertical stem 10 free to turn in a block 11, the latter being interposed between and bolted or otherwise rigidly secured to the end portions of the bars 5 of the hanger, as shown in Fig. 2, whereby each of the leading wheels 6 acts as a caster wheel and can swing freely in any direction upon the vertical axis of the fork 7, while, at the same time, owing to the horizontal pivotal mounting of the hanger 5, the wheels can rise and fall to accommodate themselves to inequalities in the ground without twisting or straining the main frame or having any tendency to laterally tilt the same.

In order to impart greater stability to the pivotal hanger, an arched brace 12 is secured to each end of the hanger and extends rearwardly therefrom, the central portion of this brace being pivoted, by means of a pin 13, to a bracket 14 secured to and depending from a bridge-bar 15 which is bolted to the main frame bars 1 in the rear of the forward bridge-bar 2, the axes of the pivot bolt 4 and pivot pin 13 being in line with each other.

I claim:—

1. The combination of the frame of a potato digger with a transverse hanger frame centrally pivoted on a horizontal axis to said main frame, and having at each end a leading wheel mounted in a fork which has a vertical axial pivotal connection with the hanger.

2. The combination of the main frame bars of a potato digger said bars being spaced apart from one another, with a bridge-bar secured to and connecting said main frame bars, a hanger frame mounted upon said bridge-bar by a horizontal pivot, and leading wheels having carriers mounted upon the opposite ends of said hanger frame by means of vertical pivots.

3. The combination of the main frame bars of a potato digger, said bars being spaced apart from one another, a bridge-bar connecting said frame bars and having a depressed central portion, a yoke connected to said central portion of the bridge-bar, a horizontal longitudinal pivot bolt carried by said yoke, and a transverse hanger frame pivotally mounted upon said bolt and carrying, at each end, a pivotally mounted leading wheel.

4. The combination of the main frame bars of a potato digger, said bars being spaced apart from one another, front and rear bridge-bars connecting said main frame bars, a hanger frame having, at each end, a pivotally mounted leading wheel, an arched brace extending rearwardly from said hanger frame, and pivotal connections between said hanger frame and the forward bridge-bar and between the brace and the rear bridge-bar, said pivotal connections having axes in line with one another.

In testimony whereof, I have signed my name to this specification, in the presence of two subscribing witnesses.

LELAND WILLIS.

Witnesses:
J. P. CRANSTON,
ROBT. A. SHEPHERD.